United States Patent
Kunai (10) Patent No.: US 9,995,853 B2
(45) Date of Patent: Jun. 12, 2018

(54) METHOD FOR PRODUCING POLARIZING PLATE AND POLARIZING PLATE

(71) Applicant: Sumitomo Chemical Company, Limited, Tokyo (JP)

(72) Inventor: Yuichiro Kunai, Arlington, MA (US)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 0 days. days.

(21) Appl. No.: 15/121,532

(22) PCT Filed: Feb. 3, 2015

(86) PCT No.: PCT/JP2015/052915
§ 371 (c)(1),
(2) Date: Aug. 25, 2016

(87) PCT Pub. No.: WO2015/129399
PCT Pub. Date: Sep. 3, 2015

(65) Prior Publication Data
US 2016/0363699 A1    Dec. 15, 2016

(30) Foreign Application Priority Data
Feb. 27, 2014    (JP) ................................ 2014-036750

(51) Int. Cl.
*G02B 1/10* (2015.01)
*G02B 1/14* (2015.01)
(Continued)

(52) U.S. Cl.
CPC .......... *G02B 1/14* (2015.01); *B29D 11/00644* (2013.01); *G02B 1/10* (2013.01);
(Continued)

(58) Field of Classification Search
CPC . G02B 1/14; G02B 1/10; G02B 5/305; G02B 5/30; G02B 5/3025; G02B 5/3033;
(Continued)

(56) References Cited

U.S. PATENT DOCUMENTS 6,897,916 B2 * 5/2005 Hamamoto ....... G02F 1/133528
349/96
9,833,983 B2 * 12/2017 Kim ................... B32B 38/0012
(Continued)

FOREIGN PATENT DOCUMENTS

CN    101644792 A    2/2010
CN    102834748 A    12/2012
(Continued)

OTHER PUBLICATIONS

Office Action dated May 16, 2017 in JP Application No. 2014-036750.
(Continued)

*Primary Examiner* — William R Alexander
(74) *Attorney, Agent, or Firm* — Panitch Schwarze Belisario & Nadel LLP (57) ABSTRACT

A method for producing a polarizing plate is provided, which includes the steps of obtaining a laminated film by forming a polyvinyl alcohol-based resin layer on a surface of a substrate film, obtaining a stretched film by stretching the laminated film, obtaining a polarizing laminated film by forming a polarizing layer by dyeing the polyvinyl alcohol-based resin layer of the stretched film with a dichroic dye, bonding a protective film composed of a thermoplastic resin to a surface of the polarizing layer opposite to the substrate film with an adhesive layer being interposed, peeling off the substrate film, and forming a protective layer having a thickness not smaller than 3 μm and composed of a cured
(Continued)

product of a photo-curable compound on a surface which appears as a result of peeling off of the substrate film.

9 Claims, 3 Drawing Sheets

(51) Int. Cl.
  *G02B 5/30* (2006.01)
  *B29D 11/00* (2006.01)
  *B29K 29/00* (2006.01)
(52) U.S. Cl.
  CPC .............. *G02B 5/30* (2013.01); *G02B 5/305* (2013.01); *G02B 5/3025* (2013.01); *G02B 5/3041* (2013.01); *B29K 2029/04* (2013.01); *B29K 2995/0097* (2013.01)
(58) Field of Classification Search
  CPC ............ G02B 5/3041; B29D 11/00644; B29D 11/00634
  USPC .................................... 359/487.02
  See application file for complete search history.

(56) References Cited

U.S. PATENT DOCUMENTS

| | | | | |
|---|---|---|---|---|
| 2004/0212885 | A1* | 10/2004 | Mizushima | G02F 1/133528 359/489.15 |
| 2006/0210767 | A1* | 9/2006 | Yoshitomi | G02B 1/105 428/141 |
| 2006/0280882 | A1* | 12/2006 | Oka | C08J 5/18 428/1.31 |
| 2007/0046872 | A1* | 3/2007 | Tasaka | G02F 1/133528 349/118 |
| 2007/0258141 | A1* | 11/2007 | Ohgaru | G02B 1/105 359/487.02 |
| 2008/0143928 | A1* | 6/2008 | Fukagawa | B32B 17/10018 349/96 |
| 2009/0027599 | A1* | 1/2009 | Ohgaru | C08K 5/10 349/96 |
| 2009/0033835 | A1* | 2/2009 | Fukagawa | G02B 5/3016 349/96 |
| 2009/0066888 | A1* | 3/2009 | Kunai | G02B 5/305 349/96 |
| 2009/0086130 | A1* | 4/2009 | Oikawa | G02B 5/3025 349/96 |
| 2009/0240047 | A1* | 9/2009 | Noritsune | B29C 43/222 536/56 |
| 2009/0244445 | A1* | 10/2009 | Nakamura | B29C 43/222 349/96 |
| 2009/0257003 | A1* | 10/2009 | Yoshihara | G02B 1/105 349/96 |
| 2010/0026940 | A1* | 2/2010 | Takegami | B29C 55/00 349/102 |
| 2010/0202051 | A1 | 8/2010 | Yoshimi et al. | |
| 2011/0043733 | A1 | 2/2011 | Suzuki et al. | |
| 2012/0207976 | A1* | 8/2012 | Takagi | G02B 5/3041 428/141 |
| 2013/0118671 | A1 | 5/2013 | Takeda et al. | |
| 2013/0216805 | A1* | 8/2013 | Yasui | C09J 7/0207 428/216 |
| 2013/0235306 | A1 | 9/2013 | Ikeshima et al. | |
| 2014/0225499 | A1* | 8/2014 | Ren | G02B 27/26 313/504 |
| 2015/0219949 | A1* | 8/2015 | Kim | B32B 38/0012 349/62 |

FOREIGN PATENT DOCUMENTS

| | | |
|---|---|---|
| EP | 2290413 A1 | 3/2011 |
| JP | 2000338329 A | 12/2000 |
| JP | 200343257 A | 2/2003 |
| JP | 200993074 A | 4/2009 |
| JP | 200998653 A | 5/2009 |
| JP | 20109027 A | 1/2010 |
| JP | 2010039299 A | 2/2010 |
| JP | 2011128486 A | 6/2011 |
| JP | 2011221185 A | 11/2011 |
| JP | 2012247820 A | 12/2012 |
| JP | 2013186389 A | 9/2013 |
| KR | 20110014555 A | 2/2011 |
| KR | 20140006800 A | 1/2014 |
| WO | 2011125958 A1 | 10/2011 |
| WO | 2011136326 A1 | 11/2011 |

OTHER PUBLICATIONS

Office Action dated Jun. 13, 2017 in JP Application No. 2014-036750.
Int'l Search Report dated Mar. 10, 2015 in Int'l Application No. PCT/JP2015/052915.
Office Action dated Feb. 14, 2017 in JP Application No. 2014-036750.
Office Action dated Feb. 19, 2018 in KR Application No. 10-2016-7025265.
Office Action dated Jan. 19, 2018 in CN Application No. 201580010790.4.

* cited by examiner

METHOD FOR PRODUCING POLARIZING PLATE AND POLARIZING PLATE

CROSS-REFERENCE TO RELATED APPLICATION

This application is a Section 371 of International Application No. PCT/JP2015/052915, filed Feb. 3, 2015, which was published in the Japanese language on Sep. 3, 2015, under International Publication No. WO 2015/129399 A1, and the disclosure of which is incorporated herein by reference.

TECHNICAL FIELD

The present invention relates to a method for producing a polarizing plate and a polarizing plate.

BACKGROUND ART

Polarizing plates have widely been used in displays such as liquid crystal displays, in particular recently in flat-panel televisions and various mobile devices. A polarizing plate obtained by bonding a protective film composed of a thermoplastic resin to one surface or both surfaces of a polarizer has been common.

With widespread use of flat-panel televisions and mobile devices, a smaller thickness of a polarizing plate has increasingly been demanded. A method using a substrate film which is also herein called a "coating method" has been known as a method for producing a polarizing plate including a small-thickness polarizer [for example, Japanese Patent Laying-Open No. 2011-128486 (PTD 1)].

The coating method normally includes the steps of forming a resin layer on a substrate film by application, obtaining a polarizing laminated film by processing the resin layer to a polarizing layer through stretching and dyeing, bonding a protective film to the polarizing layer of the polarizing laminated film, and peeling off the substrate film after the protective film is bonded. With this method, decrease in thickness of the polarizing layer and the polarizing plate can readily be achieved. In addition, since the small-thickness polarizing layer and the resin layer which is a precursor thereof are always supported by the substrate film or the protective film and the polarizing layer and the resin layer are not handled alone, handleability of a film during the process is also excellent.

CITATION LIST

Patent Document

PTD 1: Japanese Patent Laying-Open No. 2011-128486

SUMMARY OF INVENTION

Technical Problem

The polarizing plate is required to withstand a heat shock test (a thermal shock test) in order to ensure stability against an abrupt temperature difference to which the polarizing plate may be exposed when it is mounted on a display. The heat shock test refers to a test in which an operation for exposure to a low-temperature environment (for example, approximately from −40 to −30° C.) for a certain period of time and an immediately following operation for exposure to a high-temperature environment (for example, approximately from 70 to 85° C.) for a certain period of time are alternately repeated. The certain period of time is normally set to 30 to 60 minutes, and normally 50 to 400 cycles are repeated with "low temperature→high temperature→" being defined as one cycle.

It has been clarified as a result of studies conducted by the present inventor, however, that when a heat shock test of a polarizing plate including a protective film on a polarizing layer is conducted and in particular when the polarizing plate has been produced by using a substrate film as in the coating method described previously, the polarizing layer is disadvantageously likely to break (hereinafter such a defect being referred to as a "fracture") due to inability to withstand expansion and contraction caused by variation in temperature. In particular, such a problem of a fracture is noticeable when a polarizing layer is decreased in thickness in order to meet the demand for a smaller thickness of a polarizing plate or when an effect of reinforcement of a polarizing layer by a protective film (in particular, a film relatively low in rigidity such as a thermoplastic resin film) is lessened by decrease in thickness of the protective film bonded to one surface or both surfaces of the polarizing layer in order to meet the demand for decrease in thickness of the polarizing plate.

An object of the present invention is to provide a method for producing a polarizing plate in which a fracture is less likely to occur in a heat shock test and a polarizing plate high in resistance to an abrupt temperature difference, in which a fracture is less likely to occur in a heat shock test.

Solution to Problem

The present invention is based on a result of studies conducted by the present inventor as follows. The present inventor has found that a fracture caused in a polarizing layer in a polarizing plate produced with a method of obtaining a polarizing laminated film by forming a polarizing layer on a substrate film, bonding a protective film to the polarizing layer, and thereafter peeling off the substrate film mainly originates from small irregularities in a surface on a side of the polarizing layer exposed by peeling off of the substrate film and that the irregularities are produced under the influence by a state of a surface of the substrate film on a side of the polarizing layer.

In other words, it has been clarified that in the production method using the substrate film, influence on a shape of a surface on the side of the polarizing layer exposed by peeling off of the substrate film by a shape of the surface of the substrate film on the side of the polarizing layer is inevitable and the shape of the surface reflects the shape of the surface of the substrate film and that smoothness of the surface on the side of the polarizing layer exposed by peeling off of the substrate film is compromised as reflecting the shape of the surface of the substrate film and with increase in arithmetic mean roughness Ra, a fracture originating from the surface irregularities is more likely to occur in the heat shock test.

The present invention was made based on the finding as set forth above, and provides a method for producing a polarizing plate and a polarizing plate as follows.

[1] A method for producing a polarizing plate, the method including the steps of:

obtaining a laminated film by forming a polyvinyl alcohol-based resin layer on a surface of a substrate film;

obtaining a stretched film by stretching the laminated film;

obtaining a polarizing laminated film by forming a polarizing layer by dyeing the polyvinyl alcohol-based resin layer of the stretched film with a dichroic dye;

bonding a protective film composed of a thermoplastic resin to a surface of the polarizing layer opposite to the substrate film with an adhesive layer being interposed;

peeling off the substrate film; and forming a protective layer on a surface which appears as a result of peeling off of the substrate film, the protective layer being composed of a cured product of a photo-curable compound and having a thickness not smaller than 3 µm.

[2] The method according to [1], wherein the surface which appears as a result of peeling off of the substrate film has arithmetic mean roughness $Ra_1$ exceeding 55 nm and the surface of the polarizing layer forming the polarizing laminated film opposite to the substrate film has arithmetic mean roughness $Ra_2$ not greater than 55 nm.

[3] A method for producing a polarizing plate, the method including the steps of:

bonding a protective film composed of a thermoplastic resin to one surface of a polarizing layer with an adhesive layer being interposed; and forming a protective layer on the other surface of the polarizing layer, the protective layer being composed of a cured product of a photo-curable compound and having a thickness not smaller than 3 µm, arithmetic mean roughness $Ra_1'$ of a surface on which the protective layer is formed being greater than arithmetic mean roughness $Ra_2'$ of a surface of the polarizing layer to which the protective film is bonded.

[4] The method according to [3], wherein the arithmetic mean roughness $Ra_1'$ exceeds 55 nm and the arithmetic mean roughness $Ra_2'$ is not greater than 55 nm.

[5] The method according to any of [1] to [4], wherein the polarizing layer has a thickness not greater than 10 µm.

[6] The method according to any of [1] to [5], wherein the protective layer has a tensile elastic modulus at 80° C. not smaller than 1500 MPa.

[7] The method according to any of [1] to [6], further including the step of laminating a pressure-sensitive adhesive layer on an outer surface of the protective layer.

[8] A polarizing plate including:

a polarizing layer having a thickness not greater than 10 µm;

a protective film disposed on one surface of the polarizing layer with an adhesive layer being interposed, the protective film being composed of a thermoplastic resin; and a protective layer disposed on the other surface of the polarizing layer, the protective layer being composed of a cured product of a photo-curable compound and having a thickness not smaller than 3 µm.

Advantageous Effects of Invention

According to the present invention, a polarizing plate highly resistant to an abrupt temperature difference, in which a fracture is less likely to occur in a heat shock test, can be provided.

DESCRIPTION OF EMBODIMENTS

A method for producing a polarizing plate according to the present invention is characterized by forming a protective layer having a prescribed thickness and made of a cured product of a photo-curable compound on one surface of a polarizing layer which is greater in arithmetic mean roughness Ra. As described above, when a surface has great arithmetic mean roughness Ra, a fracture originating from surface irregularities is likely to occur. By covering the surface with a protective layer having a prescribed thickness, however, a fracture in a heat shock test can effectively be suppressed. A protective film composed of a thermoplastic resin is bonded to the other surface of the polarizing layer with an adhesive layer being interposed.

More specifically, the method for producing a polarizing plate according to the present invention can include the following steps of:

bonding a protective film composed of a thermoplastic resin to one surface of a polarizing layer with an adhesive layer being interposed; and forming a protective layer on the other surface of the polarizing layer, the protective layer being composed of a cured product of a photo-curable compound and having a thickness not smaller than 3 µm. The obtained polarizing plate includes the protective film disposed on one surface of the polarizing layer with the adhesive layer being interposed, the protective film being composed of a thermoplastic resin, and the protective layer disposed on the other surface, the protective layer being composed of a cured product of a photo-curable compound and having a thickness not smaller than 3 µm.

In the method, arithmetic mean roughness $Ra_1'$ is greater than arithmetic mean roughness $Ra_2'$, with $Ra_1'$ representing arithmetic mean roughness of a surface on which the protective layer is formed and $Ra_2'$ representing arithmetic mean roughness of a surface of the polarizing layer to which the protective film is bonded. The "surface on which the protective layer is formed" can naturally be a surface of the polarizing layer itself. In addition, for example, when a polarizing plate is produced with the coating method and a primer layer is formed on the substrate film, the "surface on which the protective layer is formed" can be a surface of the primer layer. In this case, the obtained polarizing plate has the protective layer on the surface of the primer layer.

It has been clarified as a result of studies conducted by the present inventor that when arithmetic mean roughness $Ra_1'$ exceeds a specific value, a fracture originating from surface irregularities is likely to occur in a heat shock test. Therefore, the production method according to the present invention is particularly advantageous when the protective layer is formed on the surface having arithmetic mean roughness $Ra_1'$ exceeding a specific value, specifically, 55 nm. Arithmetic mean roughness $Ra_2'$ of the surface of the polarizing layer to which the protective film is bonded is normally not greater than 55 nm, for example, as in an example in which the polarizing plate is produced with the coating method.

Arithmetic mean roughness $Ra_1'$, $Ra_2'$ is an indicator defining surface roughness under JIS B 0601-2001 (which is also applicable to $Ra_1$, $Ra_2$ which will be described later). According to the indicator, it can be said that a surface having great arithmetic mean roughness includes many and/or great surface irregularities. Since arithmetic mean roughness is normally calculated by finding a height difference from an average height at reference points, it is a statistical value expressed with a unit of length (mainly nm). Arithmetic mean roughness can readily be obtained, for example, by obtaining an image of a surface with a confocal microscope such as PLµ 2300 marketed by Sensofar Japan Ltd. and thereafter performing statistical processing by using attached software.

A fracture is more likely to occur as a polarizing layer is smaller in thickness (for example, not greater than 10 µm) or a protective film (in particular, a film relatively low in rigidity such as a thermoplastic resin film) is smaller in thickness. According to the present invention, however, a fracture can effectively be suppressed even in such a case.

A fracture of a polarizing layer and an effect of suppression of a fracture according to the present invention will be described in further detail. When cooling and heating are repeated in a heat shock test, each layer in the polarizing plate composed of a plastic polymer repeats expansion and contraction due to thermal expansion. Furthermore, when a protective film has a strain at the time of film-forming or when a polymer forming the film is oriented, a relaxation behavior is also added. Therefore, a dimension itself of the film gradually changes for each cycle (normally shrinks). In addition to expansion and contraction due to thermal expansion, force resulting from contraction due to orientational relaxation or from contraction due to cross-linking by boric acid is also applied to the protective layer and the polarizing layer itself tends to considerably strongly contract.

In the heat shock test, the polarizing plate tends to generate very high internal stress each time it goes through a cycle due to strain caused by contraction force with which the polarizing layer tends to contract and inconsistency among complicated movements of layers arranged around the polarizing layer. A fracture of the polarizing layer is such a defect that the polarizing layer breaks along a direction of orientation of a highly oriented polyvinyl alcohol-based resin due to the internal stress.

Thus, factors for a fracture include not only contraction stress of the polarizing layer itself but also strain with respect to peripheral members (that is, properties of these peripheral members) such as a protective film and a glass substrate (a display cell such as a liquid crystal cell in practical use being assumed) to which the polarizing plate is bonded in the test. The inventor has found that, in many cases, actual occurrence of a fracture requires presence of a defective site in the polarizing plate which becomes the origin of a fracture due to specific concentration of internal stress caused by these factors and that surface irregularities in the surface of the polarizing plate on the side of the polarizing layer may form the defective site. Presence of such a defective site may lead to a fracture even though internal stress is relatively low.

Though the scope of the present invention is not restricted, a mechanism of occurrence of a fracture starting from surface irregularities in the surface of the polarizing plate on the side of the polarizing layer is estimated as follows. When irregularities sufficiently smaller than a thickness of the polarizing layer are present in the surface on the side of the polarizing layer, a small void portion which is undetectable by human eyes or a defect detector may be produced in bonding of a protective film to the surface with the use of an adhesive or in bonding a glass substrate to the surface with a pressure-sensitive adhesive layer being interposed. It is estimated that since this void portion has a size around several µm, a portion of the polarizing layer where the void portion is located maintains contraction stress of the polarizing layer as it is. It is estimated, on the other hand, that a portion where the void portion is located cannot enjoy benefits of reinforcement by the protective film or the glass substrate with the adhesive layer or the pressure-sensitive adhesive layer being interposed, and hence the portion is present as a particularly weak portion in the polarizing plate and tends to become the origin of a fracture. In fact, when a cross-section of the polarizing plate where a fracture has occurred is analyzed with a scanning electron microscope, a void portion around several µm can be detected in a portion of the fracture. Since this void portion does not have a size to such a level as being detectable by human eyes or a defect detector as described above, such measures as elimination of the polarizing plate including the void portion as a defective product are difficult to be taken.

When a polarizing plate is produced, for example, with the method of obtaining a polarizing laminated film by forming a polarizing layer on a substrate film with the coating method, bonding a protective film to the polarizing layer, and thereafter peeling off the substrate film as described above, influence by a surface state of the substrate film on a surface state of a surface which appears as a result of peeling off of the substrate film (hereinafter this surface being referred to as a "peeled surface") is inevitable, and the void portion described above which becomes a defective site is likely to be produced. According to the present invention, small irregularities can be buried by providing a protective layer composed of a cured product of a photo-curable compound on a surface with small irregularities (for example, the peeled surface) having great arithmetic mean roughness Ra. Therefore, even though the polarizing layer has a small thickness, for example, not greater than 10 µm, occurrence of a fracture can effectively be suppressed.

Figure 1:
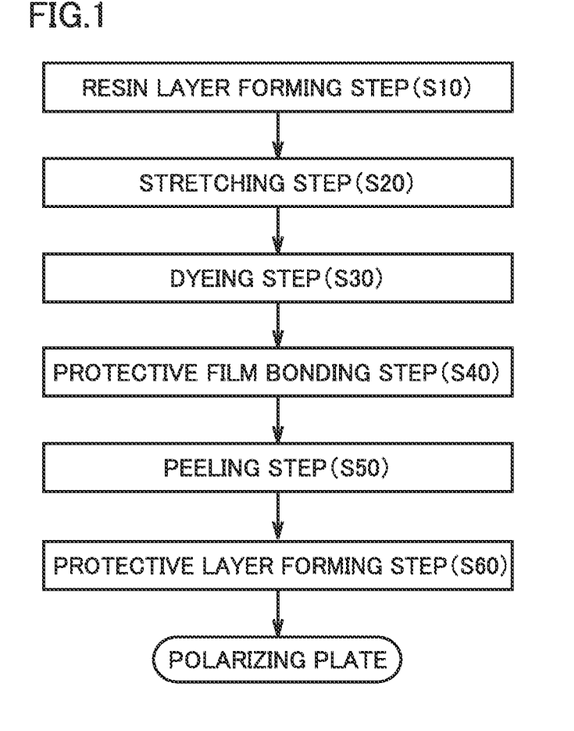
FIG. 1 is a flowchart showing one example of a method for producing a polarizing plate according to the present invention.

A preferred embodiment of the method for producing a polarizing plate according to the present invention will now be described. Referring to FIG. 1, the method for producing a polarizing plate according to this preferred embodiment uses the coating method and specifically includes:

a resin layer forming step S10 of obtaining a laminated film by forming a polyvinyl alcohol-based resin layer on at least one surface of a substrate film;

a stretching step S20 of obtaining a stretched film by stretching the laminated film;

a dyeing step S30 of obtaining a polarizing laminated film by forming a polarizing layer by dyeing the polyvinyl alcohol-based resin layer of the stretched film with a dichroic dye;

a protective film bonding step S40 of bonding a protective film composed of a thermoplastic resin to a surface of the polarizing layer of the polarizing laminated film opposite to the substrate film, with an adhesive layer being interposed;

a peeling step S50 of peeling off the substrate film; and a protective layer forming step S60 of forming a protective layer on a surface (a peeled surface) which appears as a result of peeling off of the substrate film, the protective layer being composed of a cured product of a photo-curable compound and having a thickness not smaller than 3 μm.

With the coating method, the peeled surface tends to have great arithmetic mean roughness with a surface state of the peeled surface being affected by a surface state of the substrate film. According to the method including protective layer forming step S60, occurrence of a fracture can effectively be suppressed.

The polarizing laminated film includes a substrate film and a polarizing layer disposed on at least one surface thereof, without a protective film being bonded thereto. A polarizing laminated film obtained by bonding a protective film to a polarizing layer in protective film bonding step S40 is hereinafter also referred to as a "protective film bearing polarizing laminated film" for distinction from the polarizing laminated film.

(1) Resin Layer Forming Step S10

Figure 2:
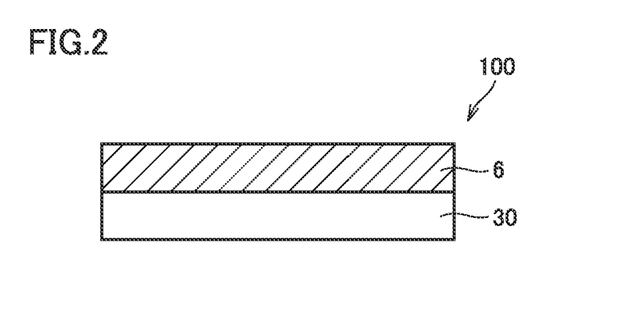
FIG. 2 is a schematic cross-sectional view showing an example of a layered structure of a laminated film obtained in a resin layer forming step.

Referring to FIG. 2, the present step includes forming a polyvinyl alcohol-based resin layer 6 on at least one surface of a substrate film 30 to obtain a laminated film 100. Polyvinyl alcohol-based resin layer 6 is to be turned into a polarizing layer 5 through stretching step S20 and dyeing step S30. Polyvinyl alcohol-based resin layer 6 can be formed by applying a polyvinyl alcohol-based resin-containing coating liquid to one or both surfaces of substrate film 30 and drying the coating layer.

Substrate film 30 can be composed of a thermoplastic resin. In particular, substrate film 30 is composed preferably of a thermoplastic resin with a high level of transparency, mechanical strength, thermal stability, stretchability, and other properties. Specific examples of such a thermoplastic resin include a polyolefin-based resin such as an acyclic polyolefin-based resin or a cyclic polyolefin-based resin (such as a norbornene-based resin), a polyester-based resin, a (meth)acrylic resin, a cellulose ester-based resin such as cellulose triacetate or cellulose diacetate, a polycarbonate-based resin, a polyvinyl alcohol-based resin, a polyvinyl acetate-based resin, a polyarylate-based resin, a polystyrene-based resin, a polyethersulfone-based resin, a polysulfone-based resin, a polyamide-based resin, a polyimide-based resin, and mixtures or copolymers thereof.

"(Meth)acryl" herein means at least one selected from acryl and methacryl. This is also applicable to "(meth) acryloyl" and the like.

Substrate film 30 may have a monolayer structure including a single resin layer of one or more thermoplastic resins or may have a multilayer structure including a stack of resin layers each containing one or more thermoplastic resins. Substrate film 30 is preferably composed of a resin capable of being stretched at a temperature suitable for stretching of polyvinyl alcohol-based resin layer 6 at the time of stretching of laminated film 100 in stretching step S20 described below.

Substrate film 30 can also contain an additive. Examples of an additive include an ultraviolet absorber, an antioxidant, a lubricant, a plasticizer, a release agent, a discoloration preventing agent, a flame retardant, a nucleating agent, an antistatic agent, a pigment, and a colorant. The content of the thermoplastic resin in substrate film 30 is preferably 50 to 100% by weight, more preferably 50 to 99% by weight, even more preferably 60 to 98% by weight, and particularly preferably 70 to 97% by weight.

Generally, in view of strength and workability such as handleability, the thickness of substrate film 30 is preferably 1 to 500 μm, more preferably 1 to 300 μm, even more preferably 5 to 200 μm, and most preferably 5 to 150 μm.

A coating liquid for coating on substrate film 30 is preferably a polyvinyl alcohol-based resin solution obtained by dissolving polyvinyl alcohol-based resin powders in a good solvent (e.g., water). Examples of the polyvinyl alcohol-based resin include a polyvinyl alcohol resin and derivatives thereof. Examples of derivatives of a polyvinyl alcohol resin include polyvinyl formal, polyvinyl acetal, and other derivatives obtained by modifying a polyvinyl alcohol resin with olefins such as ethylene and propylene; derivatives obtained by modifying a polyvinyl alcohol resin with unsaturated carboxylic acids such as acrylic acid, methacrylic acid, and crotonic acid; derivatives obtained by modifying a polyvinyl alcohol resin with an alkyl ester of an unsaturated carboxylic acid; and derivatives obtained by modifying a polyvinyl alcohol resin with (meth)acrylamide. The modification rate is preferably less than 30 mol % and more preferably less than 10 mol %. If modification is performed at a rate higher than 30 mol %, the modified product is less likely to adsorb a dichroic dye and polarizing performance may disadvantageously be low. Among the polyvinyl alcohol-based resins described above, a polyvinyl alcohol resin is preferably used.

The polyvinyl alcohol-based resin preferably has an average polymerization degree of 100 to 10000, more preferably 1000 to 10000, further preferably 1500 to 8000, and most preferably 2000 to 5000. The average polymerization degree can be determined with a method defined under "testing methods for polyvinyl alcohol" according to JIS K 6726-1994. When the average polymerization degree is lower than 100, it is difficult to obtain preferred polarizing performance. When the average polymerization degree exceeds 10000, solubility in a solvent becomes poor and it becomes difficult to form polyvinyl alcohol-based resin layer 6.

The polyvinyl alcohol-based resin is preferably a saponified product of a polyvinyl acetate based resin. A saponification degree is preferably in the range not lower than 80 mol %, more preferably not lower than 90 mol %, and further preferably not lower than 94 mol %. When a saponification degree is excessively low, a polarizing laminated film or a polarizing plate can be insufficient in resistance to water and moist heat. Though a perfectly saponified product (having a saponification degree of 100 mol %) may be acceptable, too high a saponification degree may lead to a low speed of dyeing, which may result in a long period of time for production for providing sufficient polarizing performance and possible failure in obtaining a polarizing layer having sufficient polarizing performance. Therefore, the saponification degree is preferably not higher than 99.5 mol % and further preferably not higher than 99.0 mol %.

The saponification degree is a unit ratio (mol %) representing a rate of conversion from acetic acid groups (acetoxy groups ($-OCOCH_3$)) in a polyvinyl acetate-based resin as a raw material for the polyvinyl alcohol-based resin into hydroxyl groups by a saponification process. This is defined by the following formula.

Saponification degree (mol %)=[(the number of hydroxyl groups)÷(the number of hydroxyl groups+the number of acetic acid groups)]×100

A saponification degree can be determined according to JIS K 6726 (1994). A higher saponification degree indicates a higher hydroxyl group content and thus indicates a lower content of acetic acid groups inhibiting crystallization.

Examples of the polyvinyl acetate-based resin include polyvinyl acetate that is a homopolymer of vinyl acetate, and a copolymer of vinyl acetate and other monomers copolymerizable therewith. Examples of other monomers copolymerizable with vinyl acetate include unsaturated carboxylic acids, olefins, vinyl ethers, unsaturated sulfonic acids, and ammonium group-containing (meth)acrylamides.

If necessary, the coating liquid may contain an additive such as a plasticizer or a surfactant. The plasticizer may be a polyol or a condensate thereof, examples of which include glycerol, diglycerol, triglycerol, ethylene glycol, propylene glycol, and polyethylene glycol. The additive is suitably added in an amount less than or equal to 20% by weight of the polyvinyl alcohol-based resin.

The method for applying the coating liquid to substrate film 30 can appropriately be selected from among such methods as wire bar coating, roll coating such as reverse coating or gravure coating, die coating, comma coating, lip coating, spin coating, screen coating, fountain coating, dipping, spraying, and other methods.

A temperature and a time period for drying the coating layer (the polyvinyl alcohol-based resin layer before drying) are set depending on a type of the solvent in the coating liquid. A drying temperature is, set, for example, to 50 to 200° C. and preferably to 60 to 150° C. When the solvent contains water, the drying temperature is preferably higher than or equal to 80° C.

Polyvinyl alcohol-based resin layer 6 may be formed on only one or both of the two surfaces of substrate film 30. When polyvinyl alcohol-based resin layers 6 are formed on both surfaces, two polarizing plates can be obtained from a single polarizing laminated film 300. This is also advantageous for polarizing plate production efficiency.

In laminated film 100, polyvinyl alcohol-based resin layer 6 preferably has a thickness from 3 to 30 μm and more preferably from 5 to 20 μm. When polyvinyl alcohol-based resin layer 6 has a thickness in this range, polarizing layer 5 that is well dyed with the dichroic dye, has high polarizing performance, and has a sufficiently small thickness (for example, not greater than 10 μm) can be obtained through stretching step S20 and dyeing step S30 described below. If polyvinyl alcohol-based resin layer 6 has a thickness less than 3 μm, the stretched product can be too thin and tend to have poor dyeability.

Before the coating liquid is applied, the surface of substrate film 30 on which at least polyvinyl alcohol-based resin layer 6 is to be formed may be subjected to a corona treatment, a plasma treatment, a flame treatment, or other treatments for improving adhesiveness between substrate film 30 and polyvinyl alcohol-based resin layer 6.

Before the coating liquid is applied, polyvinyl alcohol-based resin layer 6 may be formed on substrate film 30 with a primer layer being interposed in order to improve adhesion between substrate film 30 and polyvinyl alcohol-based resin layer 6.

The primer layer can be formed by applying a primer layer-forming coating liquid to the surface of substrate film 30 and then drying the coating. The primer layer-forming coating liquid contains a component providing relatively strong adhesion to both of substrate film 30 and polyvinyl alcohol-based resin layer 6. The primer layer-forming coating liquid normally contains a resin component providing such adhesion and a solvent. The resin component is preferably a thermoplastic resin with a high level of transparency, thermal stability, and stretchability, such as a (meth) acrylic resin or a polyvinyl alcohol-based resin. In particular, a polyvinyl alcohol-based resin that provides good adhesion is preferably used. A polyvinyl alcohol resin is more preferably used. Though a general organic solvent or a water-based solvent which can dissolve the resin component is normally used as a solvent, the primer layer is preferably formed of a coating liquid containing water as a solvent.

In order to increase strength of the primer layer, a cross-linking agent may be added to the primer layer-forming coating liquid. The cross-linking agent is selected as appropriate from among organic, inorganic, and other known cross-linking agents, depending on a type of the thermoplastic resin used. Examples of the cross-linking agent include an epoxy-based cross-linking agent, an isocyanate-based cross-linking agent, a dialdehyde-based cross-linking agent, a metal-based (metal salts, metal oxides, metal hydroxides, and organometallic compounds) cross-linking agent, and a polymeric cross-linking agent. When a polyvinyl alcohol-based resin is used as a resin component to form the primer layer, a polyamide epoxy resin, a methylolated melamine resin, a dialdehyde-based cross-linking agent, or a metal chelate compound-based cross-linking agent is suitably used.

The primer layer preferably has a thickness approximately from 0.05 to 1 μm and more preferably from 0.1 to 0.4 μm. The primer layer with a thickness less than 0.05 μm will be less effective in improving adhesion between substrate film 30 and polyvinyl alcohol-based resin layer 6. The primer layer with a thickness greater than 1 μm is disadvantageous for reduction in thickness of the polarizing plate.

The primer layer-forming coating liquid may be applied to substrate film 30 by a method the same as that for the polyvinyl alcohol-based resin layer-forming coating liquid. The primer layer is applied to the surface to which the polyvinyl alcohol-based resin layer-forming coating liquid is to be applied. A temperature for drying the coating layer of the primer layer-forming coating liquid is set, for example, to 50 to 200° C. and preferably to 60 to 150° C. When the solvent contains water, the temperature for drying is preferably higher than or equal to 80° C.

(2) Stretching Step S20

Figure 3:
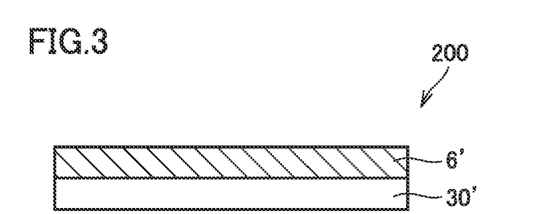
FIG. 3 is a schematic cross-sectional view showing an example of a layered structure of a stretched film obtained in a stretching step.

Referring to FIG. 3, the present step includes stretching laminated film 100 including substrate film 30 and polyvinyl alcohol-based resin layer 6 to obtain a stretched film 200 including a stretched substrate film 30' and a stretched polyvinyl alcohol-based resin layer 6'. Stretching treatment is generally uniaxial stretching.

A stretch ratio to which laminated film 100 is stretched can be selected, as appropriate, depending on desired polarizing properties. The stretch ratio is preferably from more than 5 to less than or equal to 17 and more preferably from more than 5 to less than or equal to 8 relative to the original length of laminated film 100. If the stretch ratio is less than or equal to 5, polyvinyl alcohol-based resin layer 6' may fail to sufficiently be oriented so that polarizing layer 5 may fail to have a sufficiently high degree of polarization. On the other hand, if the stretch ratio exceeds 17, the film can easily be broken during stretching, and stretched film 200 may be thinner than necessary so that it may have lower workability and handleability in later steps.

A stretching treatment is not limited to single-stage stretching and can also be multi-stage stretching. In this case, the entire stretching treatment in multiple stages may continuously be performed before dyeing step S30, or the stretching treatment in second and later stretching stages may be performed simultaneously with a dyeing treatment and/or a cross-linking treatment in dyeing step S30. When the stretching treatment in multiple stages is performed as such, the stretching treatment is preferably performed in such a way that the cumulative stretch ratio of all stretching stages exceeds 5.

The stretching treatment may be longitudinal stretching that is performed in the longitudinal direction of the film (the film feed direction), transverse stretching that is performed in the widthwise direction of the film, or oblique stretching. Longitudinal stretching may be stretching between rolls that is performed by using rolls, compressing stretching, stretching with chucks (clips), or the like. Transverse stretching may be tentering or the like. The stretching treatment may be performed by using any of wet stretching and dry stretching. Use of dry stretching is preferred in that a temperature for stretching can be selected within a wide range.

A stretching temperature is set to be higher than or equal to a temperature at which polyvinyl alcohol-based resin layer 6 and substrate film 30 exhibit such fluidity that they can be stretched as a whole. The stretching temperature is preferably in the range from −30° C. to +30° C. representing a phase transition temperature (melting point or glass transition temperature) of substrate film 30, more preferably in the range from −30° C. to +5° C., and even more preferably in the range from −25° C. to +0° C. When substrate film 30 is composed of two or more resin layers, the phase transition temperature means the highest phase transition temperature of the phase transition temperatures of the two or more resin layers.

If the stretching temperature is lower than a phase transition temperature of −30° C., it may be difficult to achieve a high stretch ratio greater than 5, or substrate film 30 may have too low fluidity and tend to be difficult to be stretched. If the stretching temperature exceeds a phase transition temperature of +30° C., substrate film 30 may have too high fluidity and tend to be difficult to be stretched. The stretching temperature is more preferably higher than or equal to 120° C. in the above range, so that a high stretch ratio greater than 5 can more easily be achieved.

The method of heating laminated film 100 in the stretching treatment includes a zone heating method (e.g., a method of heating in a stretching zone such as a heating furnace in which adjustment to a certain temperature has been made by blowing of hot air); a method of heating rolls themselves used for stretching; or a heater heating method (a method of heating with radiant heat from infrared heaters, halogen heaters, panel haters, or other heaters placed above and below laminated film 100). In the method of stretching between rolls, the zone heating method is preferred in view of stretching temperature uniformity.

A preheating step of preheating laminated film 100 may be performed before stretching step S20. The preheating method may be the same as the heating method in the stretching treatment. A preheating temperature is preferably in a range from −50° C. to ±0° C. representing a stretching temperature and more preferably in a range from −40° C. to −10° C. representing a stretching temperature.

After the stretching treatment in stretching step S20, a heat setting step may be performed. Heat setting is a process of subjecting stretched film 200 to heat treatment at a temperature higher than or equal to a crystallization temperature while ends of stretched film 200 are held under tension with clips. Heat setting facilitates crystallization of polyvinyl alcohol-based resin layer 6'. A heat setting temperature is preferably in a range from −80° C. to −0° C. representing a stretching temperature and more preferably a range from −50° C. to −0° C. representing a stretching temperature.

(3) Dyeing Step S30

Figure 4:
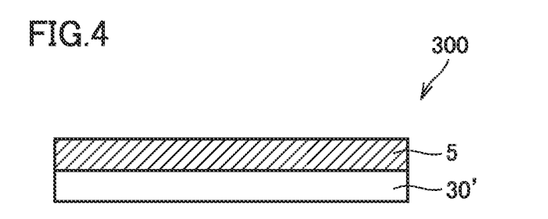
FIG. 4 is a schematic cross-sectional view showing an example of a layered structure of a polarizing laminated film obtained in a dyeing step.

Referring to FIG. 4, the present step includes dyeing polyvinyl alcohol-based resin layer 6' of stretched film 200 with a dichroic dye and adsorbing and orienting the dichroic dye to form polarizing layer 5. After the present step, polarizing laminated film 300 having substrate film 30' and polarizing layer 5 disposed on one or both surfaces thereof is obtained. Iodine or a dichroic organic dye can specifically be employed as the dichroic dye.

The dyeing step can be performed by immersing the entire stretched film 200 in a dichroic dye-containing solution (dyeing solution). The dyeing solution can be a solution obtained by dissolving the dichroic dye in a solvent. Water is generally used as the solvent for the dyeing solution. An organic solvent miscible with water may further be added to water. The dyeing solution preferably has a dichroic dye concentration from 0.01 to 10% by weight, more preferably from 0.02 to 7% by weight, and even more preferably from 0.025 to 5% by weight.

When iodine is used as the dichroic dye, an iodide is preferably further added to the iodine-containing dyeing solution so that dyeing efficiency can further be improved. Examples of the iodide include potassium iodide, lithium iodide, sodium iodide, zinc iodide, aluminum iodide, lead iodide, copper iodide, barium iodide, calcium iodide, tin iodide, and titanium iodide. The dyeing solution preferably has an iodide concentration from 0.01 to 20% by weight. Among the iodides, potassium iodide is preferably added. When potassium iodide is added, a weight ratio of iodine to potassium iodide is preferably in a range from 1:5 to 1:100, more preferably in a range from 1:6 to 1:80, and even more preferably in a range from 1:7 to 1:70. A temperature of the dyeing solution is preferably in a range from 10 to 60° C. and more preferably in a range from 20 to 40° C.

Dyeing step S30 can also be performed before stretching step S20, or these steps can also be performed at the same time. Dyeing step S30 is preferably performed after at least a certain level of stretching is achieved for laminated film 100 so that the dichroic dye adsorbed to the polyvinyl alcohol-based resin layer can well be oriented. Specifically, dyeing step S30 can be performed on stretched film 200 obtained by performing stretching until a target ratio is attained in stretching step S20, or the stretching treatment can also be performed to a ratio lower than the target in stretching step S20 and then the stretching treatment can also be performed in dyeing step S30 until the total stretch ratio reaches the target ratio. The latter embodiment may be a process 1) that includes performing the stretching treatment to a ratio lower than the target in stretching step S20 and then performing the stretching treatment during the dyeing treatment in dyeing step S30 in such a way that the total stretch ratio reaches the target ratio. When a cross-linking treatment is performed after the dyeing treatment as described below, such an embodiment may also be a process 2) that includes performing the stretching treatment to a ratio lower than the target in stretching step S20, then performing the stretching treatment to such an extent that the total stretch ratio is still lower than the target ratio during the dyeing treatment in dyeing step S30, and then performing the stretching treatment during the cross-linking treatment in such a way that the total stretch ratio finally reaches the target ratio.

Dyeing step S30 can include a cross-linking treatment step that follows the dyeing treatment. The cross-linking treatment can be performed by immersing the dyed film in a cross-linking agent-containing solution (cross-linking solution). A conventionally known material can be used as the cross-linking agent, examples of which include a boron compound such as boric acid and borax, glyoxal, and glutaraldehyde. One cross-linking agent may be used alone, or two or more cross-linking agents may be used in combination.

The cross-linking solution can specifically be a solution obtained by dissolving a cross-linking agent in a solvent. For example, water can be used as the solvent. In addition to water, the solvent may further contain an organic solvent miscible with water. A concentration of the cross-linking agent in the cross-linking solution is preferably in a range from 1 to 20% by weight and more preferably in a range from 6 to 15% by weight.

The cross-linking solution can contain an iodide. Addition of an iodide allows polarizing layer 5 to have more uniform in-plane polarizing performance. Examples of the iodide include potassium iodide, lithium iodide, sodium iodide, zinc iodide, aluminum iodide, lead iodide, copper iodide, barium iodide, calcium iodide, tin iodide, and titanium iodide. The cross-linking solution preferably has an iodide concentration from 0.05 to 15% by weight and more preferably from 0.5 to 8% by weight. A temperature of the cross-linking solution is preferably in a range from 10 to 90° C.

The cross-linking agent can be added to the dyeing solution so that the cross-linking treatment can be performed simultaneously with the dyeing treatment. The stretching treatment may also be performed during the cross-linking treatment. A specific embodiment in which the stretching treatment is performed during the cross-linking treatment is as described above. The treatment of immersion in the cross-linking solution may also be performed twice or more by using two or more cross-linking solutions different in composition.

After dyeing step S30, a washing step and a drying step are preferably performed before a protective film bonding step S40 described below. The washing step normally includes a water washing step. The water washing treatment can be performed by immersing the dyed or cross-linked film in pure water such as ion-exchanged water or distilled water. A water washing temperature is normally in a range from 3 to 50° C. and preferably in a range from 4 to 20° C. The washing step may be a combination of the water washing step and the step of washing with an iodide solution.

The drying step performed after the washing step may be performed with any appropriate method such as air drying, air blow drying, or drying by heating. For example, in the case of drying by heating, a drying temperature is normally from 20 to 95° C.

Polarizing layer 5 of polarizing laminated film 300 can have a thickness, for example, not greater than 30 μm and furthermore not greater than 20 μm. From a point of view of decrease in thickness of the polarizing plate, the thickness is preferably not greater than 10 μm and more preferably not greater than 8 μm. Polarizing layer 5 normally has a thickness not smaller than 2 μm.

Arithmetic mean roughness $Ra_2$ (corresponding to arithmetic mean roughness $Ra_2'$ described above) of a surface of polarizing layer 5 of polarizing laminated film 300 opposite to substrate film 30' is normally not greater than 55 nm and more typically not greater than approximately 40 nm when polarizing layer 5 is formed by applying a coating liquid containing a polyvinyl alcohol-based resin to substrate film 30 and performing the stretching and dyeing steps.

(4) Protective Film Bonding Step S40

Figure 5:
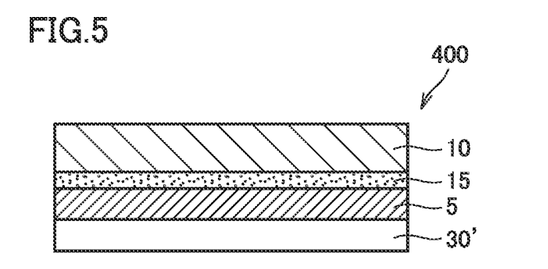
FIG. 5 is a schematic cross-sectional view showing an example of a layered structure of a protective film-bearing polarizing laminated film obtained in a protective film bonding step.

Referring to FIG. 5, the present step includes bonding protective film 10 composed of a thermoplastic resin to a surface of polarizing layer 5 of polarizing laminated film 300 opposite to substrate film 30' with an adhesive layer 15 being interposed, to obtain a protective film bearing polarizing laminated film 400. When polarizing laminated film 300 has polarizing layers 5 on both surfaces of substrate film 30', protective films are normally bonded to respective polarizing layers 5 on both surfaces. In this case, protective films may be of the same or different types.

A material for forming protective film 10 is preferably a thermoplastic resin which allows passage of light therethrough (is preferably optically transparent), and examples of such resins can include a polyolefin-based resin such as an acyclic polyolefin-based resin (such as a polypropylene-based resin) or a cyclic polyolefin-based resin (such as a norbornene-based resin); a cellulose ester-based resin such as cellulose triacetate or cellulose diacetate; a polyester-based resin; a polycarbonate-based resin; a (meth)acrylic resin; a polystyrene based resin; or any mixture or copolymer thereof.

Protective film 10 can also be a protective film capable of also having an optical function, such as a retardation film or a brightness enhancement film. For example, the film made of the thermoplastic resin may be stretched (uniaxially or biaxially stretched) or coated with a liquid crystal layer to form a retardation film with any retardation value.

The acyclic polyolefin-based resin can be a homopolymer of an acyclic olefin, such as a polyethylene resin or a polypropylene resin, or a copolymer of two or more acyclic olefins.

A cyclic polyolefin-based resin is a generic name for resins obtained by polymerization of cyclic olefins as polymerization units. Specific examples of the cyclic polyolefin-based resin include ring-opened (co)polymers of cyclic olefins, addition polymers of cyclic olefins, copolymers (typically random copolymers) of cyclic olefins and chain olefins such as ethylene and propylene, graft polymers obtained by modifying these polymers with an unsaturated carboxylic acid or a derivative thereof, and hydrides thereof. In particular, norbornene-based resins containing a norbornene monomer, such as norbornene or a polycyclic norbornene monomer, as the cyclic olefin are preferably used.

The cellulose ester-based resin is an ester of cellulose and a fatty acid. Specific examples of the cellulose ester-based resin include cellulose triacetate, cellulose diacetate, cellulose tripropionate, and cellulose dipropionate. Copolymers of these resins or resins obtained by partially modifying hydroxyl groups of these resins with other substituents can also be used. Among them, cellulose triacetate (triacetylcellulose (TAC)) is particularly preferred.

The polyester-based resin is a resin having ester bonds, and is generally formed of a polycondensate of a polyvalent carboxylic acid or a derivative thereof and a polyhydric alcohol. The polyvalent carboxylic acid or the derivative thereof may be a bivalent dicarboxylic acid or a derivative thereof, examples of which include terephthalic acid, isophthalic acid, dimethyl terephthalate, and dimethyl naphthalenedicarboxylate. The polyhydric alcohol may be bivalent diol, examples of which include ethylene glycol, propanediol, butanediol, neopentyl glycol, and cyclohexanedimethanol.

A specific example of the polyester-based resin includes polyethylene terephthalate, polybutylene terephthalate, polyethylene naphthalate, polybutylene naphthalate, polytrimethylene terephthalate, polytrimethylene naphthalate, polycyclohexane dimethyl terephthalate, and polycyclohexane dimethyl naphthalate.

The polycarbonate-based resin is composed of a polymer in which monomer units are linked by carbonate groups. The polycarbonate-based resin may also be a resin called modified polycarbonate, which has a modified polymer skeleton or a copolymerized polycarbonate.

The (meth)acrylic resin is a resin composed of a (meth) acryloyl group-containing compound as a main monomer component. Specific examples of the (meth)acrylic resin include poly(meth)acrylates such as polymethyl methacrylate, methyl methacrylate-(meth)acrylic acid copolymers, methyl methacrylate-(meth)acrylate copolymers, methyl methacrylate-acrylate-(meth)acrylic acid copolymers, methyl (meth)acrylate-styrene copolymers (such as MS resins), and copolymers of methyl methacrylate and an alicyclic hydrocarbon group-containing compound (such as methyl methacrylate-cyclohexyl methacrylate copolymers and methyl methacrylate-norbornyl (meth)acrylate copolymers). A polymer composed mainly of poly($C_{1-6}$ alkyl (meth)acrylate) such as polymethyl (meth)acrylate is preferably used, and a methyl methacrylate-based resin mainly composed of methyl methacrylate (50 to 100% by weight and preferably 70 to 100% by weight) is more preferably used.

Description of each thermoplastic resin shown above is also applicable to a thermoplastic resin which forms substrate film 30.

A surface treatment layer (coating layer) such as a hard coat layer, an antiglare layer, an antireflection layer, an antistatic layer, or an antifouling layer can also be formed on the surface of protective film 10 opposite to polarizing layer 5. The method used to form the surface treatment layer on the protective film surface is not particularly limited and can be a known method.

Though protective film 10 preferably has a small thickness from a point of view of decrease in thickness of the polarizing plate, too small a thickness leads to lowering in strength and poor workability. Therefore, protective film 10 has a thickness preferably from 5 to 90 µm or smaller, more preferably from 5 to 60 µm, and further preferably from 5 to 50 µm. Even when protective film 10 has a thickness not greater than 30 µm, according to the present invention, a fracture of the polarizing layer in a heat shock test can effectively be suppressed.

For example, a water-based adhesive or a photo-curable adhesive can be employed as an adhesive used to form adhesive layer 15. The water-based adhesive may be an adhesive including a polyvinyl alcohol-based resin aqueous solution or a two-component aqueous urethane-based emulsion adhesive. In particular, a water-based adhesive including a polyvinyl alcohol-based resin aqueous solution is preferably employed when a cellulose ester based resin film subjected to a surface treatment (a hydrophilic treatment) such as a saponifying treatment is employed as protective film 10.

The polyvinyl alcohol-based resin may be a vinyl alcohol homopolymer obtained by saponifying polyvinyl acetate that is a homopolymer of vinyl acetate; a polyvinyl alcohol-based copolymer obtained by saponifying a copolymer of vinyl acetate and other monomers copolymerizable therewith; or a modified polyvinyl alcohol-based polymer obtained by partially modifying hydroxyl groups of these polymers. The water-based adhesive may contain an additive such as polyvalent aldehyde, a water-soluble epoxy compound, a melamine-based compound, a zirconia compound, or a zinc compound.

The bonding step is performed by applying a water-based adhesive to a bonding surface of polarizing layer 5 and/or protective film 10 of polarizing laminated film 300, bonding the film with an adhesive layer being interposed, and preferably pressuring and bringing the film into intimate contact by using a bonding roll. A method of applying a water-based adhesive (also a photo-curable adhesive) is not particularly restricted, and a conventionally known method such as casting, Meyer bar coating, gravure coating, comma coater, doctor blade, die coating, dip coating, and spraying can be employed.

When a water-based adhesive is used, preferably, the step of drying bonded films is performed to remove water contained in the water-based adhesive after bonding. Drying can be performed, for example, by introducing the film into a drying furnace. A drying temperature (a temperature of the drying furnace) is preferably set to 30 to 90° C. If it is lower than 30° C., protective film 10 tends to easily separate from polarizing layer 5. If the drying temperature exceeds 90° C., polarizing performance of polarizing layer 5 may be degraded by heat. The drying time period can be approximately from 10 to 1000 seconds, and from a point of view of productivity, it is set preferably to 60 to 750 seconds and more preferably to 150 to 600 seconds.

The drying step may be followed by the step of aging at room temperature or a temperature slightly higher than room temperature such as a temperature approximately from 20 to 45° C. for about 12 to 600 hours. An aging temperature is generally set to be lower than the drying temperature.

The photo-curable adhesive refers to an adhesive capable of being cured by exposure to light such as ultraviolet rays, examples of which can include an adhesive containing a polymerizable compound and a photopolymerization initiator, an adhesive containing a photoreactive resin, and an adhesive containing a binder resin and a photoreactive cross-linking agent. Examples of the polymerizable compound can include a photopolymerizable monomer such as a photo-curable epoxy-based monomer, a photo-curable acrylic monomer, and a photo-curable urethane-based monomer and an oligomer derived from a photopolymerizable monomer. Examples of the photopolymerization initiator can include those containing a substance which produces active species such as neutral radicals. anion radicals, and cation radicals as a result of irradiation with light such as ultraviolet rays. An adhesive containing a photo-curable epoxy-based monomer and a photo-cationic polymerization initiator can preferably be used as a photo-curable adhesive containing a polymerizable compound and a photopolymerization initiator.

When a photo-curable adhesive is used, bonding described above is followed by a drying step as necessary (when the photo-curable adhesive contains a solvent) and then a curing step in which the photo-curable adhesive is cured by exposure to light. Light for irradiation is not particularly limited, however, light preferably has an emission distribution at a wavelength less than or equal to 400 nm. Specifically, a low-pressure mercury lamp, a medium-pressure mercury lamp, a high-pressure mercury lamp, an ultrahigh-pressure mercury lamp, a chemical lamp, a black light lamp, a microwave-excited mercury lamp, or a metal halide lamp is preferably used as a light source.

Before protective film 10 is bonded to polarizing layer 5, a bonding surface of protective film 10 can be subjected to a surface treatment (adhesion promoting treatment) such as a plasma treatment, a corona treatment, an ultraviolet irradiation treatment, a flame treatment, or a saponification treatment in order to have improved adhesion to polarizing layer 5. In particular, a plasma treatment, a corona treatment, or a saponification treatment is preferably performed. For example, when protective film 10 is composed of a cyclic polyolefin-based resin, a plasma treatment or a corona treatment is normally performed. When the protective film is composed of a cellulose ester-based resin, a saponification treatment is normally performed. The saponification treatment may be a method of immersing the film in an aqueous solution of an alkali such as sodium hydroxide or potassium hydroxide.

(5) Peeling Step S50

Figure 6:
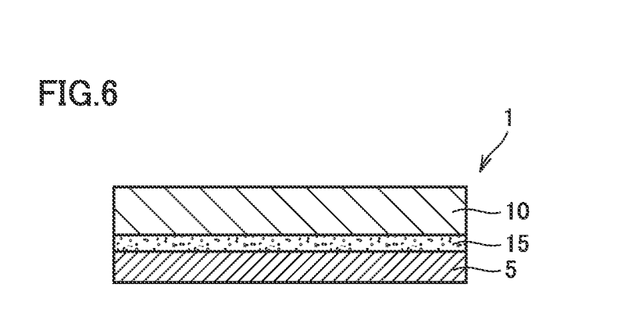
FIG. 6 is a schematic cross-sectional view showing a layered structure of a single side protective film-bearing polarizing plate obtained in a peeling step.

Referring to FIG. 6, the present step includes peeling off substrate film 30' after protective film bonding step S40. After this step, a single side protective film-bearing polarizing plate 1 can be obtained. When polarizing laminated film 300 has polarizing layers 5 on both surfaces of substrate film 30' and protective films are bonded to respective polarizing layers 5, two single side protective film-bearing polarizing plates 1 are obtained from single polarizing laminated film 300 after peeling step S50.

The method of peeling off substrate film 30' is not particularly limited. Substrate film 30' can be peeled off by a method the same as in the step of peeling off a separator (release film) that is performed on a normal pressure-sensitive adhesive-bearing polarizing plate. Substrate film 30' may be peeled off immediately after protective film bonding step S40. Alternatively, after protective film bonding step S40, the film may be wound in a form of a roll, and then substrate film 30' may be peeled off while the roll is unwound in a later step.

A surface which appears as a result of peeling off of substrate film 30' normally has arithmetic mean roughness $Ra_1$ (corresponding to arithmetic mean roughness $Ra_1'$ described above) exceeding 55 nm.

(6) Protective Layer Forming Step S60

Figure 7:
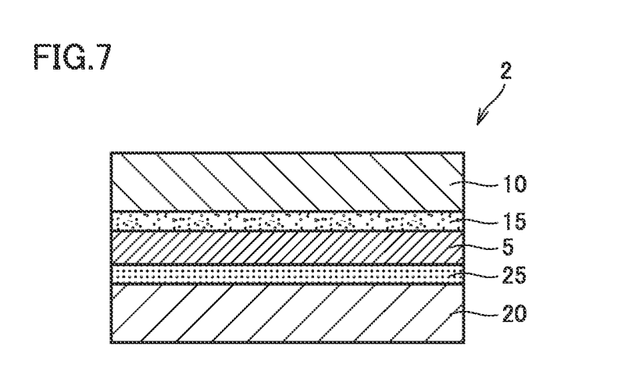
FIG. 7 is a schematic cross-sectional view showing a layered structure of a polarizing plate including a protective film and a protective layer obtained in a protective layer forming step.

Referring to FIG. 7, the present step is a step of obtaining a polarizing plate 2 having protective film 10 and a protective layer 25 by forming protective layer 25 composed of a cured product of a photo-curable compound and having a thickness not smaller than 3 μm a peeled surface which appears as a result of peeling off of substrate film 30' (the surface on the side of polarizing layer 5). The peeled surface on which protective layer 25 is formed can be the surface of a primer layer when the primer layer is formed in resin layer forming step S10. A fracture of polarizing layer 5 in a heat shock test can effectively be suppressed by forming protective layer 25 and burying irregularities in the peeled surface having great arithmetic mean roughness $Ra_1$.

Protective layer 25 is composed of a cured product of a photo-curable compound. Unlike a thermosetting compound, the photo-curable compound is advantageous in that alteration in hue or in surface state of polarizing layer 5 or deterioration of polarizing performance is less likely to occur. With the photo-curable compound, protective layer 25 can be formed of a system not containing a solvent and the photo-curable compound can instantaneously be cured by irradiation with light, and hence damage to polarizing layer 5 is less. When protective layer 25 is formed of a system containing a solvent, alteration in hue or surface state of polarizing layer 5 or deterioration of polarizing performance may be caused.

Protective layer 25 can be formed by curing a photo-curable composition containing a photo-cationic polymerizable monomer or a photo-radical polymerizable monomer as a photo-curable compound and a photopolymerization initiator. When a photo-cationic polymerizable monomer is used, a photo-cationic polymerization initiator is used together, and when a photo-radical polymerizable monomer is used, a photo-radical polymerization initiator is used together.

An epoxy based monomer represents a suitable example of the photo-cationic polymerizable monomer, and in particular, an alicyclic epoxy based monomer is suitable. A vinyl based monomer represents a suitable example of the photo-radical polymerizable monomer, and in particular, an acrylic monomer is suitable. Only one type of the photo-curable compound may be used, or two or more types of the photo-curable compounds may be used together. A photo-cationic polymerizable monomer and a photo-radical polymerizable monomer can also be used together. A rate of curing and a viscosity of a photo-curable composition or a tensile elastic modulus of a cured product can be adjusted by combining photo-curable compounds.

A photo-curable composition which forms protective layer 25 can contain other additives such as a polymerization accelerator, an ion trapping agent, an antioxidant, a chain transfer agent, a tackifier, a high-molecular-weight component such as a thermoplastic resin, a filler, a flow modifier, a plasticizer, an antifoaming agent, an antistatic agent, and a leveling agent.

A specific method of forming protective layer 25 on a peeled surface can include, for example, a) a method of directly coating the peeled surface with a photo-curable composition and curing the coating layer by irradiating the coating layer with light and b) a method of coating a substrate (a release film) which can be peeled off with a photo-curable composition, thereafter disposing the photo-curable composition on the peeled surface on a side of the coating layer, curing the coating layer by irradiating the coating layer with light, and thereafter peeling off the substrate.

A method of applying a photo-curable composition is not particularly restricted, and a conventionally known method such as casting, Meyer bar coating, gravure coating, comma coater, doctor blade, die coating, dip coating, and spraying can be employed.

Though light for irradiation is not particularly limited, light preferably has an emission distribution at a wavelength not longer than 400 nm. Specifically, a low-pressure mercury lamp, a medium-pressure mercury lamp, a high-pressure mercury lamp, an ultrahigh-pressure mercury lamp, a chemical lamp, a black light lamp, a microwave-excited mercury lamp, or a metal halide lamp is preferably employed as a light source.

In forming protective layer 25 on the peeled surface, in order to improve adhesiveness with protective layer 25, the peeled surface can be subjected to a surface treatment (adhesion promoting treatment) such as a plasma treatment, a corona treatment, an ultraviolet irradiation treatment, a flame treatment, or a saponification treatment.

Protective layer 25 has a thickness not smaller than 3 μm and preferably not smaller than 5 μm. When a thickness is smaller than 3 μm, an effect of suppression of a fracture noticeably lowers. From a point of view of decrease in thickness of the polarizing plate, protective layer 25 has a thickness preferably not greater than 30 μm and more preferably not greater than 20 μm.

In any of the methods a) and b) described above, in order not to produce a void portion derived from surface irregularities in the peeled surface at an interface between formed protective layer 25 and the peeled surface, it is important that protective layer 25 have a large thickness not smaller than 3 μm. In the method a) of directly applying a photo-curable composition to the peeled surface, the photo-curable composition is more conformable to the peeled surface than in the method b). Therefore, even though protective layer 25 has a smaller thickness, the void portion does not tend to be produced. In consideration also of an effect of protection of the polarizing layer by protective layer 25, protective layer 25 desirably has a thickness not smaller than 3 μm. In the method b), in order to further prevent the void portion from being produced, in addition to setting a thickness of protective layer 25 to 3 μm or greater, such a method as 1) extension of a time period from disposing of a substrate with the coating layer on the peeled surface until irradiation with ultraviolet rays, 2) decrease in line speed, 3) increase in pressure in bonding of a substrate with the coating layer to the peeled surface, and 4) lowering in viscosity of a photo-curable composition (a viscosity may be lowered by raising a temperature) may together be used.

Protective layer 25 has a tensile elastic modulus at 80° C. preferably not smaller than 1500 MPa and more preferably not smaller than 1800 MPa. An effect of suppression of a fracture can further be enhanced by forming protective layer 25 having a tensile elastic modulus not smaller than 1500 MPa. Protective layer 25 normally has a tensile elastic modulus not greater than 10000 MPa. A tensile elastic modulus of protective layer 25 refers to a tensile elastic modulus of a single film composed of a cured product obtained by photo-curing a photo-curable composition which forms protective layer 25.

A tensile elastic modulus of protective layer 25 is measured as follows. Initially, a photo-curable composition for forming a protective layer is applied to a release film which can be peeled off, the composition is irradiated with light under conditions the same as in formation of protective layer 25, and thus a layer of a cured product is formed. Then, this layer of the cured product together with the release film is cut into 1 cm wide×8 cm long, thereafter the release film is peeled off, and a single film of the layer of the cured product is obtained. Then, opposing ends of the single film in a direction of a long side are gripped with upper and lower grippers of a tensile tester [for example, AUTOGRAPH AG-1S Tensile Tester manufactured by Shimadzu Corporation] such that a distance between the grippers is set to 5 cm, the film is pulled at a tension rate of 10 mm/minute in an environment of 80° C., and a tensile elastic modulus at 80° C. is calculated based on an initial inclination of a straight line in an obtained stress-strain curve.

Polarizing plate 2 obtained as set forth above can be made into a composite polarizing plate by bonding a peripheral member or used as such a composite polarizing plate. The peripheral member includes a protection film for prevention of damage which is bonded onto protective film 10, a pressure-sensitive adhesive layer for bonding polarizing plate 2 to a display cell or other optical members, which is laminated on an outer surface of protective film 10 or protective layer 25, a separate film disposed on an outer surface of the pressure-sensitive adhesive layer, an optical compensation film such as a retardation film which is disposed on an outer surface of protective film 10 or protective layer 25, and other optically functional films.

The pressure-sensitive adhesive layer representing one example of the peripheral member can be provided on polarizing plate 2 by providing a step of laminating the pressure-sensitive adhesive layer on the outer surface of protective film 10 or protective layer 25 after protective layer forming step S60. The pressure-sensitive adhesive layer is preferably laminated on the outer surface of protective layer 25. A pressure-sensitive adhesive which forms the pressure-sensitive adhesive layer is normally composed of a pressure-sensitive adhesive composition produced by adding a cross-linking agent such as an isocyanate compound, an epoxy compound, or an aziridine compound to a (meth) acrylic resin, a styrene-based resin, a silicone-based resin, or other base polymers. The pressure-sensitive adhesive layer may further contain fine particles to have light-scattering properties. A pressure-sensitive adhesive layer has a thickness normally of 1 to 40 μm and preferably a thickness of 3 to 25 μm.

Examples of an optically functional film representing another example of a peripheral member include a reflective polarizing film capable of allowing passage of a certain type of polarized light and reflecting polarized light of a type reverse thereto, a film with an antiglare function having irregularities on its surface, a film with a surface reflection-preventing function, a reflective film having a surface reflecting function, a translucent reflective film having both of reflecting and transmitting functions, or a viewing angle compensation film.

EXAMPLES

Hereinafter, the present invention will more specifically be described with reference to examples and comparative examples, however, the present invention is not limited to these examples and comparative examples.

In Examples and Comparative Examples below, arithmetic mean roughness Ra was found by obtaining an image of a surface by using PLμ 2300 marketed by Sensofar Japan Ltd. and thereafter performing statistical processing by using attached software. A 20× magnification lens was employed and an area of observation was set to 636.61 μm×477.25 μm.

A thickness of a protective layer was found by measuring a thickness of a polarizing plate before and after formation of the protective layer with a contact film thickness meter and calculating a difference therebetween. A tensile elastic modulus at 80° C. of the protective layer was measured in accordance with the method described above by using AUTOGRAPH AG-1 S Tester manufactured by Shimadzu Corporation.

Example 1

(1) Preparation of Substrate Film

A substrate film having a three-layered structure in which a resin layer composed of homo polypropylene ("Sumitomo® Noblen® FLX80E4" manufactured by Sumitomo Chemical Co., Ltd. and having a melting point Tm=163° C.) which was a homopolymer of propylene was arranged on opposing surfaces of a resin layer composed of a propylene/ethylene random copolymer ("Sumitomo® Noblen® W151" manufactured by Sumitomo Chemical Co., Ltd. and having a melting point Tm=138° C.) containing approximately 5 weight % of ethylene unit was prepared by coextrusion using a multi-layer extruder. The substrate film had a total thickness of 90 μm, and a thickness ratio among the layers (FLX80E4/W151/FLX80E4) was 3/4/3.

(2) Primer Layer Forming Step

Polyvinyl alcohol powders ("Z-200" manufactured by The Nippon Synthetic Chemical Industry Co., Ltd., 1100 in average polymerization degree, 99.5 mol % in saponification degree) were dissolved in hot water at 95° C. to form a polyvinyl alcohol aqueous solution at a concentration of 3% by weight. A primer layer-forming coating liquid was obtained by mixing the resulting aqueous solution and a cross-linking agent ("Sumirez Resin 650" manufactured by Taoka Chemical Co., Ltd.) at a ratio of 5 parts by weight of the cross-linking agent to 6 parts by weight of the polyvinyl alcohol powders.

Then, one surface of a substrate film prepared in (1) was subjected to a corona treatment. Thereafter, the primer layer-forming coating liquid was applied to the corona-treated surface by using a micro-gravure coater, and then dried at 80° C. for 10 minutes to form a 0.2-μm-thick primer layer.

(3) Preparation of Laminated Film (Resin Layer Forming Step)

Polyvinyl alcohol powders ("PVA 124" manufactured by KURARAY Co., Ltd., 2400 in average polymerization degree, 98.0-99.0 mol % in saponification degree) were dissolved in hot water at 95° C. to form a polyvinyl alcohol aqueous solution at a concentration of 8% by weight, which was used as a polyvinyl alcohol-based resin layer-forming coating liquid.

Using a lip coater, the polyvinyl alcohol-based resin layer-forming coating liquid was applied to the surface of the primer layer on the substrate film having the primer layer prepared in step (2). The coating was then dried at 80° C. for 20 minutes to form a polyvinyl alcohol-based resin layer on the primer layer, so that a laminated film constituted of the substrate film, the primer layer, and the polyvinyl alcohol-based resin layer was obtained.

(4) Preparation of Stretched Film (Stretching Step)

Using a floating longitudinal uniaxial stretching machine, the laminated film prepared in step (3) was subjected to free-end uniaxial stretching to 5.8 times at 160° C. to form a stretched film. After stretching, the polyvinyl alcohol-based resin layer had a thickness of 6.2 μm.

(5) Preparation of Polarizing Laminated Film (Dyeing Step)

The polyvinyl alcohol-based resin layer was dyed by immersing the stretched film prepared in step (4) for about 180 seconds in a dyeing aqueous solution at 30° C. containing iodine and potassium iodide (containing 0.6 parts by weight of iodine and 10 parts by weight of potassium iodide with respect to 100 parts by weight of water). Subsequently, the excess dyeing aqueous solution was washed away with pure water at 10° C.

Subsequently, the dyed film was immersed for 120 seconds in a first cross-linking aqueous solution at 78° C. containing boric acid (containing 9.5 parts by weight of boric acid with respect to 100 parts by weight of water) and then immersed for 60 seconds in a second cross-linking aqueous solution at 70° C. containing boric acid and potassium iodide (containing 9.5 parts by weight of boric acid and 4 parts by weight of potassium iodide with respect to 100 parts by weight of water) so that a cross-linking treatment was performed. Subsequently, the film was washed with pure water at 10° C. for 10 seconds and finally dried at 40° C. for 300 seconds, so that a polarizing laminated film constituted of the substrate film, the primer layer, and the polarizing layer was obtained.

Arithmetic mean roughness $Ra_2$ of the surface of the polarizing layer of the obtained polarizing laminated film opposite to the substrate film was measured and it was 38.5 nm.

(6) Preparation of Single Side Protective Film Bearing Polarizing Plate (Protective Film Bonding Step and Peeling Step)

"KR-70T" manufactured by ADEKA Corporation which was an ultraviolet curable adhesive containing a curable compound representing a cationically polymerizable epoxy based compound and a photo-cationic polymerization initiator was prepared.

Then, the ultraviolet curable adhesive was applied to the bonding surface of the protective film [a transparent protective film composed of triacetylcellulose (TAC) ("KC2UAW" manufactured by Konica Minolta Opto Co., Ltd.) having a thickness of 25 μm] with the use of a micro-gravure coater, and thereafter the protective film was bonded to the surface of the polarizing layer of the polarizing laminated film prepared in (5) opposite to the substrate film, with the use of a bonding roll. Thereafter, the adhesive layer was cured by irradiating the adhesive layer with ultraviolet rays with the use of a high-pressure mercury lamp on a side of the substrate film at an accumulated quantity of light of 200 mJ/cm$^2$, so that the protective film bearing polarizing laminated film constituted of a layered structure of the protective film, the adhesive layer, the polarizing layer, the primer layer, and the substrate film was obtained. The cured adhesive layer had a thickness of approximately 1 μm.

Then, the substrate film was peeled off from the protective film bearing polarizing laminated film. The substrate film was readily peeled off and a single side protective film bearing polarizing plate was obtained. The polarizing layer had a thickness of 6.7 μm. Arithmetic mean roughness $Ra_1$ of the peeled surface which appeared as a result of peeling off of the substrate film in the obtained single side protective film bearing polarizing plate was measured and it was 64.1 nm.

(7) Formation of Protective Layer (Protective Layer Forming Step)

A surface of the single side protective film bearing polarizing plate prepared in (6) on a side of the polarizing layer was subjected to a corona treatment, and thereafter the corona treated surface was coated with "KR-25T" manufactured by ADEKA Corporation which was an ultraviolet curable composition containing a curable compound representing a cationically polymerizable epoxy based compound and a photo-cationic polymerization initiator, with the use of a micro-gravure coater. Thereafter, the polarizing plate constituted of a layered structure of the protective film, the adhesive layer, the polarizing layer, the primer layer, and the protective layer was obtained by curing the coating layer by irradiating the coating layer with ultraviolet rays with the use of a high-pressure mercury lamp on a side of the coating layer at an accumulated quantity of light of 200 mJ/cm$^2$. The protective layer had a thickness of 10.5 μm. The protective layer had a tensile elastic modulus at 80° C. of 2000 MPa.

Example 2

A polarizing plate was prepared as in Example 1 except for setting a thickness of the protective layer to 5.1 μm.

Example 3

A polarizing plate was prepared as in Example 1 except for setting a thickness of the protective layer to 3.0 μm.

Comparative Example 1

A polarizing plate was prepared as in Example 1 except for setting a thickness of the protective layer to 2.0 μm.

Comparative Example 2

A polarizing plate was prepared as in Comparative Example 1 except that the protective layer was formed of an ultraviolet curable composition ["KR-70T" manufactured by ADEKA Corporation] in which a cured product (a protective layer) had a tensile elastic modulus at 80° C. of 1200 MPa.

Comparative Example 3

A polarizing plate was prepared as in Example 1 except for not forming the protective layer.

Table 1 summarizes arithmetic mean roughness $Ra_1$, $Ra_2$ and a thickness and a tensile elastic modulus at 80° C. of the protective layer in each of Examples and Comparative Examples.

[Heat Shock Test]

The polarizing plate obtained in each of Examples and Comparative Examples was cut into a chip having a 4.4" size (50 mm×100 mm) and the chip was bonded to Corning glass with the use of a pressure-sensitive adhesive layer. Here, the pressure-sensitive adhesive layer was laminated on the protective layer side of the polarizing plate. Fifty such glass-bonded samples were prepared and placed in a thermal shock tester. A heat shock test in which a cycle of operations for "holding the samples in a bath at −40° C. for 30 minutes and instantaneously thereafter transferring the samples to a bath at 85° C. and holding them for 30 minutes" was repeated 400 times was conducted. Whether or not there was a fracture in the polarizing layer in each of 50 samples was visually checked and the number of samples in which a fracture occurred was counted. The samples were taken out during the test at the time when 100 cycles were completed and when 250 cycles were completed, and the number of samples in which a fracture occurred was similarly counted. Table 1 shows results.

TABLE 1

|  |  | Example 1 | Example 2 | Example 3 | Comparative Example 1 | Comparative Example 2 | Comparative Example 3 |
|---|---|---|---|---|---|---|---|
| Arithmetic Mean Roughness $Ra_1$ (nm) | | 64.1 | 64.1 | 64.1 | 64.1 | 64.1 | 64.1 |
| Arithmetic Mean Roughness $Ra_2$ (nm) | | 38.5 | 38.5 | 38.5 | 38.5 | 38.5 | 38.5 |
| Protective Layer | Thickness (μm) | 10.5 | 5.1 | 3.0 | 2.0 | 2.0 | — |
|  | Tensile Elastic Modulus (MPa) | 2000 | 2000 | 2000 | 2000 | 1200 | — |
| The Number of Occurrences of Fracture/The Number of Samples Introduced | 100 Cycles | 0/50 | 0/50 | 0/50 | 10/50 | 14/50 | 15/50 |
|  | 250 Cycles | 0/50 | 0/50 | 0/50 | 15/50 | 25/50 | 24/50 |
|  | 400 Cycles | 0/50 | 0/50 | 0/50 | 18/50 | 31/50 | 34/50 |

REFERENCE SIGNS LIST

1 single side protective film bearing polarizing plate; 2 polarizing plate with protective film and protective layer; 5 polarizing layer; 6 polyvinyl alcohol-based resin layer; 6' stretched polyvinyl alcohol-based resin layer; 10 protective film; 15 adhesive layer; 25 protective layer; 30 substrate film; 30' stretched substrate film; 100 laminated film; 200 stretched film; 300 polarizing laminated film; 400 protective film bearing polarizing laminated film.

The invention claimed is:

1. A method for producing a polarizing plate, the method comprising the steps of:
    obtaining a laminated film by forming a polyvinyl alcohol-based resin layer on a surface of a substrate film;
    obtaining a stretched film by stretching the laminated film;
    obtaining a polarizing laminated film by forming a polarizing layer by dyeing the polyvinyl alcohol-based resin layer of the stretched film with a dichroic dye;
    bonding a protective film composed of a thermoplastic resin to a surface of the polarizing layer opposite to the substrate film with an adhesive layer being interposed;
    peeling off the substrate film; and
    forming a protective layer on a surface which appears as a result of peeling off of the substrate film, the protective layer being composed of a cured product of a photo-curable compound and having a thickness not smaller than 3 μm,
    wherein the surface which appears as a result of peeling off of the substrate film has arithmetic mean roughness $Ra_1$ exceeding 55 nm and the surface of the polarizing layer forming the polarizing laminated film opposite to the substrate film has arithmetic mean roughness $Ra_2$ not greater than 55 nm.

2. The method according to claim 1, wherein the polarizing layer has a thickness not greater than 10 μm.

3. The method according to claim 1, wherein the protective layer has a tensile elastic modulus at 80° C. not smaller than 1500 MPa.

4. The method according to claim 1, further comprising the step of laminating a pressure-sensitive adhesive layer on an outer surface of the protective layer.

5. A method for producing a polarizing plate, the method comprising the steps of:
    bonding a protective film composed of a thermoplastic resin to one surface of a polarizing layer with an adhesive layer being interposed; and
    forming a protective layer on the other surface of the polarizing layer, the protective layer being composed of a cured product of a photo-curable compound and having a thickness not smaller than 3 μm,
    arithmetic mean roughness $Ra_1'$ of a surface on which the protective layer is formed being greater than arithmetic mean roughness $Ra_2'$ of a surface of the polarizing layer to which the protective film is bonded,
    wherein the arithmetic mean roughness $Ra_1'$ exceeds 55 nm and the arithmetic mean roughness $Ra_2'$ is not greater than 55 nm.

6. The method according to claim 5, wherein the polarizing layer has a thickness not greater than 10 μm.

7. The method according to claim 5, wherein the protective layer has a tensile elastic modulus at 80° C. not smaller than 1500 MPa.

8. The method according to claim 5, further comprising the step of laminating a pressure-sensitive adhesive layer on an outer surface of the protective layer.

9. A polarizing plate comprising:

a polarizing layer having a thickness not greater than 10 μm;

a protective film disposed on one surface of the polarizing layer with an adhesive layer being interposed, the protective film being composed of a thermoplastic resin; and a protective layer disposed on the other surface of the polarizing layer, the protective layer being composed of a cured product of a photo-curable compound and having a thickness not smaller than 3 μm, wherein the arithmetic mean roughness $Ra_1'$ of a surface on which the protective layer is formed exceeds 55 nm and the arithmetic mean roughness $Ra_2'$ of a surface of the polarizing layer to which the protective film is bonded is not greater than 55 nm.

* * * * *